(12) United States Patent
Tunuguntla et al.

(10) Patent No.: US 10,789,668 B2
(45) Date of Patent: Sep. 29, 2020

(54) INTELLIGENT PROVISIONING OF VIRTUAL GRAPHIC PROCESSING UNIT RESOURCES

(71) Applicant: VMWARE, INC., Palo Alto, CA (US)

(72) Inventors: Muralidhara Gupta Tunuguntla, Bangalore (IN); Sendhil Kumar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 93 days.

(21) Appl. No.: 15/346,744

(22) Filed: Nov. 9, 2016

(65) Prior Publication Data

US 2018/0060996 A1 Mar. 1, 2018

(30) Foreign Application Priority Data

Aug. 31, 2016 (IN) .............................. 201641029726

(51) Int. Cl.
*G06T 1/20* (2006.01)
*G06F 9/50* (2006.01)

(52) U.S. Cl.
CPC .............. *G06T 1/20* (2013.01); *G06F 9/5077* (2013.01)

(58) Field of Classification Search
CPC ......... G06T 1/20; G06T 1/60; G06F 9/45558; G06F 2009/4557; G06F 3/064; G06F 11/3433
See application file for complete search history.

(56) References Cited

U.S. PATENT DOCUMENTS

| 8,284,205 B2* | 10/2012 | Miller | G06F 1/3203 |
| | | | 345/502 |
| 2012/0254868 A1* | 10/2012 | Hansson | G06F 9/45558 |
| | | | 718/1 |
| 2017/0132747 A1* | 5/2017 | Wilt | G06T 1/20 |
| 2017/0293994 A1* | 10/2017 | Li | G06T 1/20 |

OTHER PUBLICATIONS

VMware, "Resource Management with VMware DRs", https://www.vmware.com/pdf/vmware_drs_wp.pdf, 2006, 24 pages.
VMware, "VMware® Distributed Power Management Concepts and Use", Technical White paper, https://www.vmware.com/content/dam/digitalmarketing/vmware/en/pdf/techpaper/Distributed-Power-Management-vSphere.pdf, 2008,18 pages.
Nvidia, "Nvidia Grid Overview", http://www.nvidia.in/content/grid/resources/NVIDIA_GRID_Graphics_virtualization_guide.pdf, 2016, 6 pages.

(Continued)

*Primary Examiner* — Samantha (Yuehan) Wang
(74) *Attorney, Agent, or Firm* — Loza & Loza, LLP

(57) ABSTRACT

A system and method for placing virtual computing instances in a distributed computer system utilizes virtual graphic processing unit (vGPU) requirements of the virtual computing instances to place the virtual computing instances on a plurality of hosts of the distributed computer system. Each virtual computing instance with vGPU requirements is placed on one of the plurality of hosts in the distributed computer system based on the vGPU requirements of that virtual computing instance. Each virtual computing instance without vGPU requirements is placed on one of the plurality of hosts in the distributed computer system without any vGPU consideration.

17 Claims, 10 Drawing Sheets

(56) References Cited

OTHER PUBLICATIONS

Nvidia, "Nvidia Grid Virtual GPU technology", retrieved Apr. 13, 2020, http://www.nvidia.com/object/grid-technology.html, 6 pages.
Vmware, "VMware Horizon with Nvidia Grid vGPU", http://images.nvidia.com/content/grid/vmware/horizon-solution-brief.pdf, 2015, 4 pages.
Nvidia, "Nvidia Grid™ VGPU™ deployment guide for Vmware", Version 6.1, https://www.vmware.com/files/pdf/products/horizon/grid-vgpu-deployment-guide.pdf, Mar. 2015, 234 pages.
Nvidia, "Nvidia Grid 2.0", Datasheet, http://images.nvidia.com/content/pdf/grid/data-sheet/NVIDIA-GRID2O-DS.pdf, 2016, 2 pages.
Nvidia, "Nvidia Grid K1 and K2", Datasheet, http://www.nvidia.in/content/cloud-computing/pdf/nvidia-grid-datasheet-k1-k2.pdf, 2013, 2 pages.

\* cited by examiner

US 10,789,668 B2

INTELLIGENT PROVISIONING OF VIRTUAL GRAPHIC PROCESSING UNIT RESOURCES

RELATED APPLICATIONS

Benefit is claimed under 35 U.S.C. 119(a)-(d) to Foreign Application Serial No. 201641029726 filed in India entitled "INTELLIGENT PROVISIONING OF VIRTUAL GRAPHIC PROCESSING UNIT RESOURCES", on Aug. 31, 2016, by VMware, Inc., which is herein incorporated in its entirety by reference for all purposes.

BACKGROUND

When virtual computing instances, such as virtual machines (VMs), are placed on different hosts in a computing environment, such as a cloud computing environment, various factors must be considered to efficiently utilize resources of the hosts. For initial placement of VMs in a computing environment, current placement techniques typically consider only memory and central processing unit (CPU) utilization to select the hosts for VM placements. Thus, the selection of hosts for VM initial placement is random with respect to virtual graphic processing unit (vGPU) resources, which can result in non-optimal utilization of physical GPU resources in a clustered environment. In addition, for certain physical GPUs, some of the VMs placed in hosts using these physical GPUs may make the VMs incompatible for virtualization operations, such as automatic migration operations (e.g., VMware vSphere® vMotion® operations).

In these cases, solving the underutilization problem with respect to vGPU resources may require administrators to explicitly power off some of the VMs identify suitable hosts for these VMs and perform cold migration of the VMs to the identified hosts, which would be a challenging task for the administrators for large-scale VM deployments.

Even after a vGPU underutilization problem has been solved for initial placement, the vGPU underutilization problem may reappear as VMs are subsequently turned off for various reasons. This may further require the administrators to explicitly power off some of the VMs, identify suitable hosts for these VMs and perform cold migration of the VMs to the identified hosts to try to resolve the vGPU underutilization problem.

SUMMARY

A system and method for placing virtual computing instances in a distributed computer system utilizes virtual graphic processing unit (vGPU) requirements of the virtual computing instances to place the virtual computing instances on a plurality of hosts of the distributed computer system. Each virtual computing instance with vGPU requirements is placed on one of the plurality of hosts in the distributed computer system based on the vGPU requirements of that virtual computing instance. Each virtual computing instance without vGPU requirements is placed on one of the plurality of hosts in the distributed computer system without any vGPU consideration.

A method for placing virtual computing instances in a distributed computer system in accordance with an embodiment of the invention comprises receiving a request to deploy a virtual computing instance in the distributed computer system, determining whether the virtual computing instance is graphics-oriented, a graphics-oriented being a virtual computing instance with virtual graphic processing unit (vGPU) requirements, if the virtual computing instance is graphics-oriented, placing the virtual computing instance on one of a plurality of hosts in the distributed computer system based on the vGPU requirements of the virtual computing instance, and if the virtual computing instance is not graphics-oriented, placing the virtual computing instance on one of the plurality of hosts in the distributed computer system without any vGPU consideration. In some embodiments, the steps of this method are performed when program instructions contained in a computer-readable storage medium are executed by one or more processors.

A system in accordance with an embodiment of the invention comprises memory and a processor configured to receive a request to deploy a virtual computing instance in the distributed computer system, determine whether the virtual computing instance is graphics-oriented, a graphics-oriented being a virtual computing, instance with virtual graphic processing unit (vGPU) requirements, if the virtual computing instance is graphics-oriented, place the virtual computing instance on one of a plurality of hosts in the distributed computer system based on the vGPU requirements of the virtual computing instance, and if the virtual computing instance is not graphics-oriented, place the virtual computing instance on one of the plurality of hosts in the distributed computer system without any vGPU consideration.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and, advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
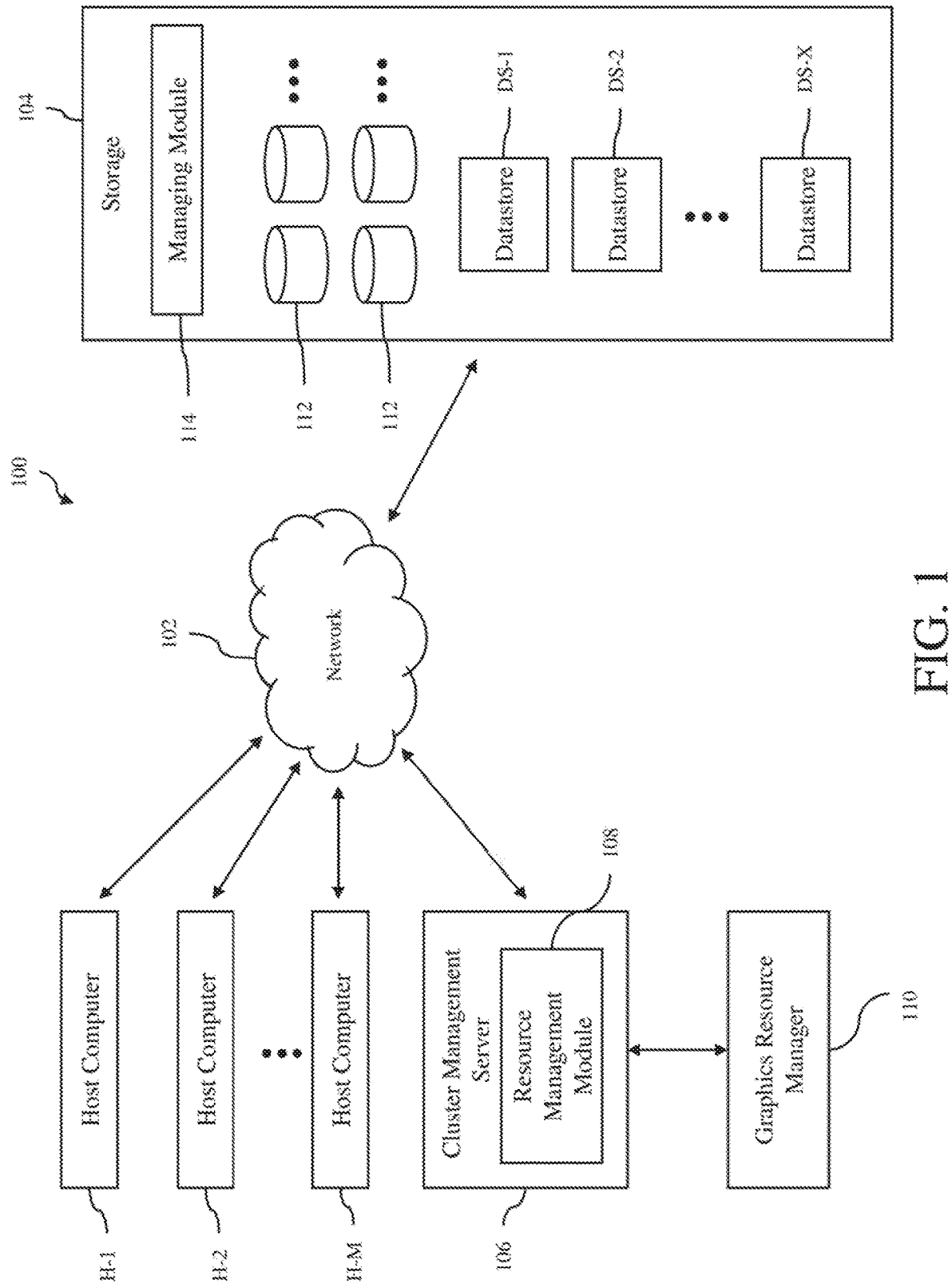
FIG. 1 is a block diagram of a distributed computer system in accordance with an embodiment of the invention.

Turning now to FIG. 1, a distributed computer system 100 in accordance with an embodiment of the invention is shown. As illustrated in FIG. 1, the distributed computer system includes a network 102, a cluster of host computers H-1, H-2 . . . H-M (where M is a positive integer), storage 104, a cluster management server 106 with a resource management module 108, and a graphics resource management module 110. The host computers, the storage, the cluster management server and the graphics resource management module are connected to the network. Thus, each of these components is able to access the storage via the network and may share the resources provided by the storage with the other components of the system. Consequently any process running on any of the host computers may also access the storage via the network.

In an embodiment, the host computers H-1, H-2 . . . H-M are physical computer systems that host or support one or more virtual computing instances so that the virtual computing instances are executing on the physical computer systems. As used herein, the term "virtual computing instance" is any soft entity that can run on a computer system, such as a software application, a software process, a virtual machine (VM) and a "container" that provides system-level process isolation, such as a Docker container. The host computers may be servers that are commonly found in datacenters. As an example, the host computers may be servers installed in a single server rack. However, in other embodiments, the host computers may be installed in multiple server racks in the same or different facilities. Still, in other embodiments, the host computers may be software processes running on multiple physical computer systems.

Figure 2:
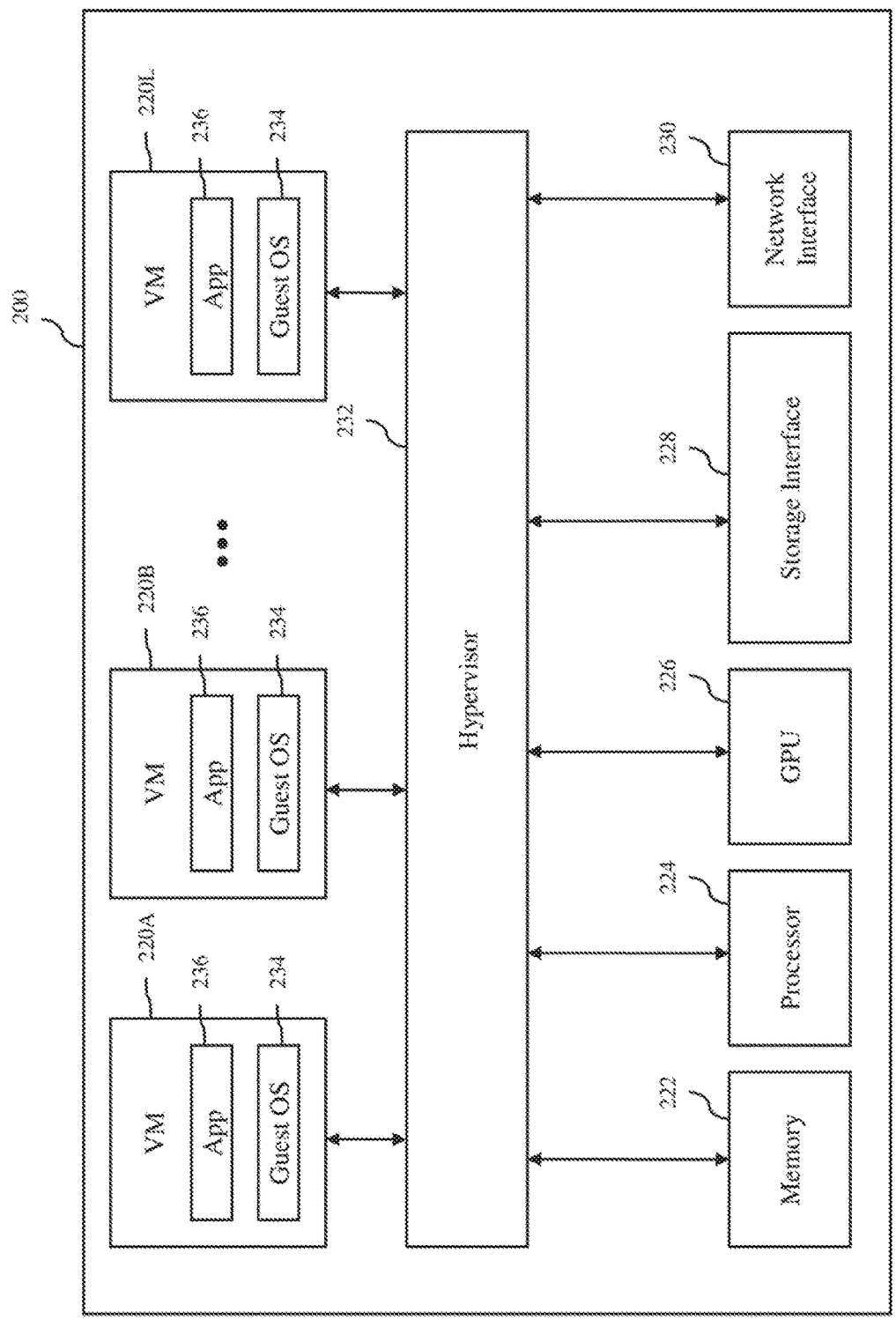
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of virtual computing instances 220A, 220B . . . 220L (where L is a positive integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more graphic processing units (GPUs) 226, one or more storage interfaces 228, and one or more network interfaces 230. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. Each GPU 226 can be any type of a graphics processor. In some embodiments, each GPU is part of a graphics card, such as an NVIDIA GRID K1/K2 card. The storage interface 228 is an interface that allows that host computer to communicate with the storage 104. As an example, the storage interface may be a host bus adapter or a network file system interface. The network interface 230 is an interface that allows the host computer to communicate with other devices connected to the network 102. As an example, the network interface may be a network adapter.

In the illustrated embodiment, the VMs 220A, 220B . . . 220L run on "top" of a hypervisor 232, which is a software interface layer that, using virtualization technology, enables sharing of the hardware resources of the host computer 200 by the VMs. However, in other embodiments, one or more of the VMs can be nested, i.e., a VM running in another VM. An computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 234 and one or more guest applications 236. The guest operating system manages virtual system resources made available to the corresponding VM by the hypervisor, and, among other things, the guest operating system forms a software platform on top of which the guest applications run.

Similar to any other computer system connected to the network 102, the VMs 220A, 220B . . . 220L are able to communicate with other computer systems connected to the network using the network interface 230 of the host computer 200. In addition, the VMs are able to access the storage 104 using the storage interface 228 of the host computer.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 112, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 114, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cluster management server 106 operates to monitor and manage the host computers H-1, H-2 . . . H-M. The cluster management server may be configured to monitor the current configurations of the host computers and the virtual computing instances running on the host computers for example virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include virtual computing instance hosting information, i.e., which virtual computing instances, e.g., VMs, are hosted or running: on which host computers. The monitored configurations may also include virtual computing instance information. The virtual computing instance information may include size of each of the virtual computing instances, i.e., virtualized hardware configuration of each of the virtual computing instances, such as virtual CPU type, number of virtual CPUs, virtual memory size, and virtual storage size, as well as software configuration of each of the virtual computing instances, such as OS type and installed applications or software programs running on each of the virtual computing instances. The virtual computing instance information may also include resource parameter settings, such as demand, limit, reservation and share values for various resources, e.g., CPU, memory, network bandwidth and storage, which are consumed by the virtual computing instances. The demands of the virtual computing instances for the consumable resources are determined by the host computers or the hypervisors hosting the clients by monitoring the current usage of resources by the virtual computing instances, e.g., CPU processing usage, memory usage, network usage and/or storage usage, and provided to the cluster management server.

The cluster management Server 106 may also perform operations to manage the virtual computing instances and the host computers H-1, H-2 . . . H-M in the cluster. As illustrated in FIG. 1, in an embodiment, the cluster management server includes the resource management module 108 which can be enabled by a user, to perform various resource management operations for the cluster, including virtual computing instance placement operations for either initial placement of virtual computing instances and/or load balancing. The process for initial placement of virtual computing instances, such as VMs, may involve selecting suitable host computers for placement of the virtual computing instances, based on memory and CPU requirements of the virtual computing instances, the current memory and CPU load on all the host computers in the cluster and the memory and CPU capacity of all the host computers in the cluster.

In some embodiments, the cluster management server 106 may be a physical computer. In other embodiments, the cluster management server may be implemented as one or more software programs running on one or more physical computers, such as the host computer 200 shown in FIG. 2, or virtual computers, such as the 220A, 220B . . . 220L. In an implementation, the cluster management server is a VMware vCenter™ Server with at least some of the features available for such a server, and the resource management module 108 in the cluster management server is VMware vSphere® Distributed Resource Scheduler™ module.

The graphics resource management module 110 operates with the cluster management server 108 to ensure that virtual graphics processing unit (vGPU) requirements of virtual computing instances are considered for placement of the virtual computing instances on the host computers H-1, H-2 . . . H-M in the cluster (sometimes referred to herein as hosts), which may be part of an initial deployment operation of a pool of virtual computing instances or part of a subsequent resource management operation, such as power management operation, so that GPU resources of the hosts in the cluster are efficiently utilized. Unlike conventional placement operations that only considers memory and CPU requirements of virtual computing instances, the graphics resource management allows vGPU requirements to be considered hen placing virtual computing instances so that underutilization of GPU resources is minimized. When GPU resources are not considered for placement of virtual computing instances, serious problems may arise that may be nearly impossible to resolve, as explained below.

NVIDIA GRID™ K1/K2 cards are graphics hardware that may be installed in host computers, which may be used by virtual computing instances, e.g., VMs, on the host computers to run graphics operations. The NVIDIA GRID™ cards are equipped with four (4) physical GPUs and its own dedicated hardware memory called frame buffer. NVIDIA GRID™ vGPU™ technology helps the VMs to get a guaranteed chunk of the graphics hardware for hosting the VMs workload and at the same time enables sharing of hardware across the VMs. The graphics hardware chunk allocated to the VMs may be defined by NVIDIA graphics profiles. Every VM can be tagged with an NVIDIA graphics profile, which is a tag that defines the chunk of hardware allocated to that VM.

NVIDIA provides a wide range of graphics profile tags that can be assigned in accordance with the hardware requirements of the host computers and/or virtual computing instances. NVIDIA GRID™ K1 card consists of four (4) physical GPUs and 16 GB of frame buffer memory. Table 1 below indicates the tag/virtual GPU type provided by NVIDIA and the hardware chunk associated with each profile.

TABLE 1

| Tag/vGPU type | Frame Buffer Memory | Max vGPU per GPU | Max vGPUs per card |
| --- | --- | --- | --- |
| K120Q | 512 MB | 8 | 32 |
| K140Q | 1 GB | 4 | 16 |
| K160Q | 2 GB | 2 | 8 |
| K180Q | 4 GB | 1 | 4 |

Each NVIDIA GRID™ K1 card can host a maximum of 32 VMs and minimum of 4 VMs depending on the graphics profile tags associated with the VMs.

NVIDIA imposes restrictions on the sharing of the GPUs of their graphics card. Each physical GPU can only accommodate the graphics working set of VMs tagged with identical graphics profiles. It does not allow heterogeneous profiles to be run on a single physical GPU. That is, VMs tagged with different graphics profiles cannot run on a single physical GPU of an NVIDIA GRID™ K1 card.

Figure 3:
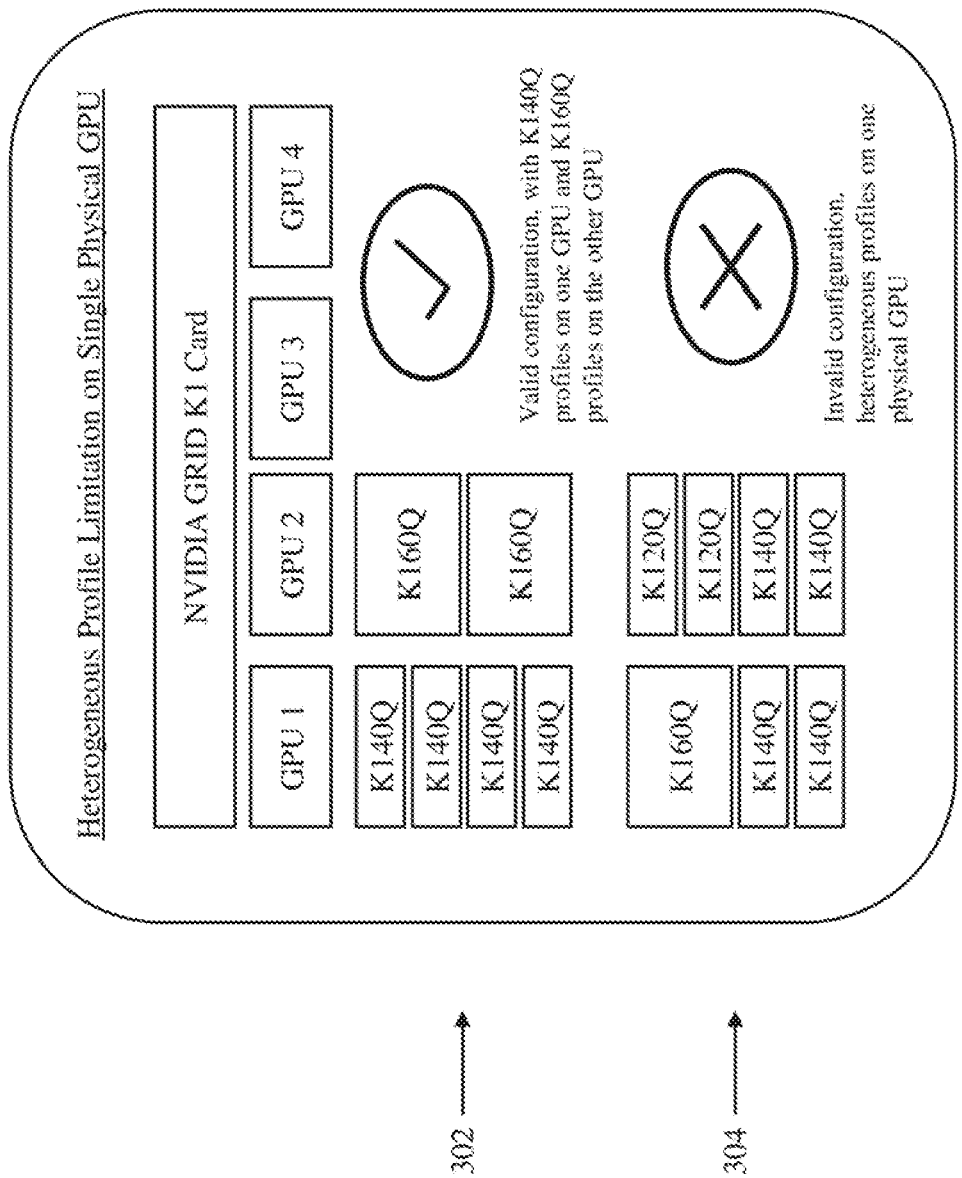
FIG. 3 is a diagram illustrating a restriction on heterogeneous profiles on a graphics card.

This restriction is illustrated in FIG. 3, which shows an NVIDIA GRID™ K1 card in two different, configurations 302 and 304, one of which is considered to be a valid configuration of graphics profiles and the other is considered to be an invalid configuration of graphics profiles. In the configuration 302, the graphics profiles on each GPU are the same or homogenous. In particular, GPU 1 of the graphics card is hosting four VMs with the K140Q profile and GPU 2 of the graphics card is hosting four VMs with the K160Q profile. Since the graphics profiles on GPU 1 and the graphics profiles on GPU 2 are homogeneous, this configuration is deemed to be a valid configuration of graphics profiles. However, in the configuration 304, the graphics profiles on each GPU are not same or homogenous. In particular, CPU 1 of the graphics card is hosting one VM with the K160Q profile and two VMs with the K140Q profile, and GPU2 is hosting two VMs with the K120Q profile and two VMs with the K140Q profile. Since the graphics profiles on GPU 1 and the graphics profiles on GPU 2 are heterogeneous, this configuration would be deemed to be an invalid configuration of graphics profiles.

Thus, as an example, when one of the GPUs is hosting a VM with a K120Q profile, that GPU cannot host a VM with a different profile even if the GPU is left with sufficient frame buffer memory. That means that if two (2) VMs are hosted on GPU ID 1 of K120Q (Consumed frame buffer is 512*2=1 Gb), the remaining 3 GB cannot be used to run the VM of K140Q profile even though that VM requires only 1 GB frame buffer memory.

This restriction on heterogeneous profile hosting on a single GPU is imposed by NVIDIA. Therefore consolidation ratio of VMs::vGPU on the cluster level is very crucial. Conventional initial VM placement algorithms making decisions on the graphics VM initial placements may result in underutilization of these resources, this becomes impossible to solve on large-scale deployments like Horizon Air Cloud deployments.

One embodiment leverages the GPU technology (such as NVIDIA GRID™ vGPU technology) using the shared pass-through mechanism of the graphics cards (such as NVIDIA GRID™ graphics cards), and thus, some important features of virtualization like live migration. Snapshot, and Suspend are being denied to the graphics profile tagged VM. Considering the denial of live migration, the initial placement of these VMs is very crucial for the best utilization a NVIDIA GRID™ GPU resources across a cluster.

Conventional processes handling the VM placement policy for graphics-oriented VMs (i.e., VMs with vGPU requirements) may result in non-optimized graphics resource utilization in a cloud based environment. Below are foreseen issues that may have to be solved in a cloud infrastructure using conventional placement processes.

1. Large cost associated with each NVIDIA GRID™ cards and underutilization of these resources will lead to high capital expenditure.
2. Solving non-optimized utilization may require power off operations over the customer's VMs in the cloud environment and manually moving them to other hosts and GPU slots by injecting configuration values explicitly on each VM.
3. Solving this non-optimization problem on a large scale may require powering off thousands of VMs on the cloud infrastructure when the problem is identified.
4. The non-optimization problem may cause errors that may require stopping all further graphics-oriented desktop VM deployments that are coming from the customer on the cloud infrastructure.

Even if the non-optimization problem is identified and solved at any stages of deployment, there is no assurance that this issue would not occur again since the same conventional placement processes will be used for subsequent VM deployments.

Figure 4:
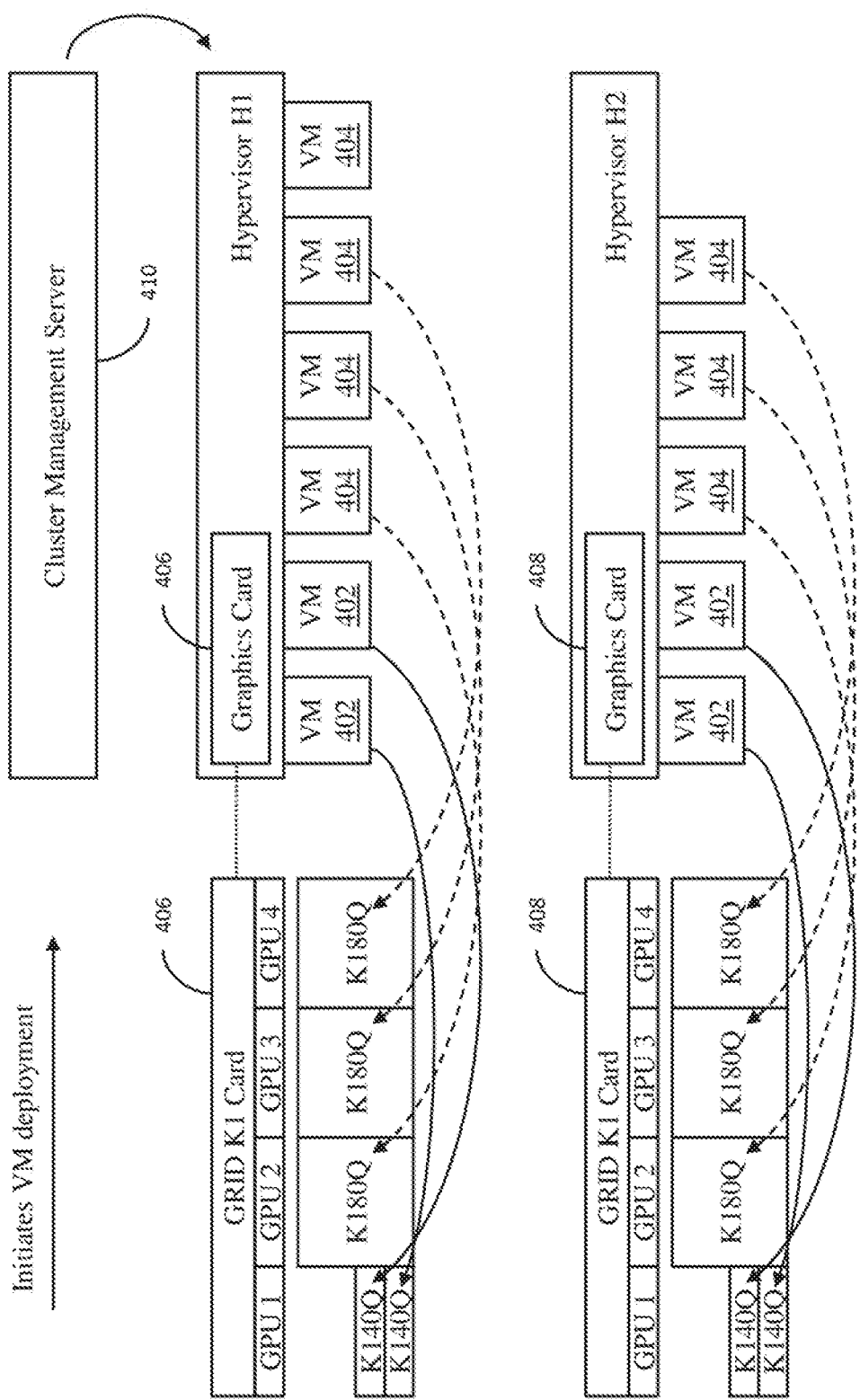
FIG. 4 is a diagram illustrating a non-optimization problem for deploying virtual machines with different graphics profiles on a cloud-based platform.

This non-optimization problem is further explained using a use case example in which a customer requirement is to provision two graphics desktop pools on a cloud-based platform that provides virtual applications and desktops to end users on any device, such as Horizon Air platform, as illustrated in FIG. 4. Pool-1 consists of four (4) VMs 402 of K140Q profile and Pool-2 consists of seven (7) VMs 404 of K180Q profile. With this requirement, the service provider will make theoretical calculations to accommodate the request from the customer.

As per the table shown above (Table 1), to accommodate the four (4) VMs 402 of K140Q profile, 4 GB (1 GB*4) of frame buffer memory is required, which can be theoretically satisfied by one (1) physical GPU. To accommodate the seven (7) VMs 404 of K180Q profile, 28 GB (4 GB*7) of frame buffer memory is needed, which means that seven (7) physical GPUs are theoretically required. Therefore, to accommodate the requirement of the two pools, eight (8) physical GPUs are required. So the service provider needs two (2) NVIDIA GRID™ K1 cards 406 and 408 since each card consists of four (4) physical GPUs. Each card can be installed on a 2-node cluster, i.e., a cluster with two (2) hosts, which are represented in FIG. 4 as hypervisors H1 and H2.

In phase I deployment for the first graphics desktop pool, i.e., Pool-1, the customer uses a cloud portal (not shown) to a cluster management center 410, e.g., a VMware vCenter™ server, to initiate the deployment of the four (4) VMs 402 which are of K140Q profile. The conventional initial VM placement algorithm handles the request of pool deployment and distributes two (2) VMs on each host of the cluster. Since the graphics hardware is available to support the four (4) K140Q profile VMs, these VM s get successfully powered on. At this point, one (1) physical GPU on each host is being utilized for two of the four (4) K140Q profile VMs 402, and thus, six (6) physical GPUs are left to be utilized (three (3) on each host).

In phase II deployment for the second graphics desktop pool, i.e., Pool-2, the customer provisions the seven (7) VMs 404 of K180Q profile, which requires seven (7) physical GPUs. Regardless of how these VMs are distributed between the two hosts, since only six (6) GPUs are now free, the seventh VM 404 does not get GPU allocation and fails to power on due to lack of resources.

When the customer reports the error back to the service provider saying that the seventh VM 404 is not powered on, the service provide will analyze the problem and determine that the Pool-1 deployment was split into the two hosts accommodating two (2) VMs 402 on each GPU. In the theoretical calculation, the service provider had accounted one (1) GPU for accommodating these four (4) K140Q profiled VMs 402. But in the actual deployment, two (2) GPUs were used with one GPU on each host, which led to 50% of resources being underutilized. Ideally, all four (4) K140Q profiled VMs 402 should have been allocated on the GPU of one of the two (2) hosts which would have made way for the Pool-2 deployment of seven (7) K180Q profiled VMs 404 on the remaining; seven (7) physical GPUs.

In order to solve this problem, the service provider will have to first identify where the VMs 402 and 404 are placed and then try to accommodate the scattered K140Q profiled VMs 402 to one physical GPU. In this process, the service provider needs to:
  shut down the two (2) K140Q profiled VM 402 on either one of the two hosts,
  inject a configuration entry that consists of the physical address of the GPU that hosts the other two (2) K140Q profiled VMs 402 (cold migration of these VMs is required after injecting values into the configuration files).
  power on the two (2) VMs and ensure that the four (4) K140Q profiled VMs are placed on one physical GPU.

In the above use case example, a graphics desktop pool deployment of a very few VMs was considered. In general, there would be much larger deployments where the problem will have much bigger consequences in a larger scale. Let's consider a cluster of thirty two (32) VMware® ESXi™ hosts, each with two (2) NVIDIA GRID™ cards, on a Horizon Air Cloud platform. With this huge infrastructure, the cluster capacity would sum up to a total of two hundred fifty six (256) physical GPUs (32 hosts*2 cards*4 GPUs). If two hundred (200) K180Q profiled VMs and two hundred twenty four (224) K140Q profiled VMs need to be deployed in this infrastructure, the potential failures will be enormous.

The requirements of the two hundred (200) K180Q profiled VMs can be theoretically accommodated on two hundred (200) physical GPUs. The requirements of the two hundred twenty four (224) K140Q profiled VMs can be theoretically accommodated on fifty six (56) GPUs. Therefore, using the total of two hundred fifty six (256) physical GPUs to the fullest extent, the customer's requirements can be met by the service provider.

Customers are charged for hardware on the Horizon Air Cloud platform. Thus, each customer is free to deploy desktop pools as needed using a cloud portal. Therefore, the pool deployment process is typically split in several phases and smaller pool chunks in accordance with the customer's internal requirements. Thus, the customer may start the pool deployment in several phases and during the final phase of the pool deployment more than 20% of the VMs may fail to power on due to the lack of graphics hardware resources.

When the service provider sees the power-on failures, the service provider will have to go back to the drawing board to first identify the problem for power-on failures. The service provider will then have to power off some of the VMs and inject configuration values, e.g., .vmx values, into the powered-off VMs pointing to the GPU hardware addresses to where the VMs should be placed. Finally, these VMs will have to be cold migrated to the appropriate hosts and then powered on.

However, the above solution is practically impossible to achieve due to the following reasons:
1. Powering off some of the VMs and hampering the customer's productivity may be unacceptable as per SLA (Service level agreement).
2. The service provider may not have sufficient expertise on vGPU allocation mechanism and/or sufficient in-depth knowledge on frame buffer allocation from various graphic hardware vendors to apply the solution.
3. Too much time may be needed to solve this issue, which depends on the scale of the problem, i.e., the number of VMs that need to be powered off to accommodate the power on failure request.
4. The solution may only be temporary since any subsequent placement decisions for a pool deployment will be made without considering the graphics hardware, which may create a similar problem.

The problem stated above can occur in any cloud datacenter environment in which similar types of GPU cards are implemented. In addition, since the power-on failures arise only during the final stages of pool deployments, some of the VMs must be powered off to resolve the failures. Furthermore, with the availability of multiple types of NVIDIA GRID™ cards (e.g., Maxwell architecture based NVIDIA GRID™ cards), each with a number of different profiles, the different placement possibilities using various profile combinations be enormous. If and when customers request to host large desktop pool sizes with at least ten (10) such profiles, the non-resource optimization will be very high with significant number of the power-on VM failures, which will be close to impossible to resolve.

The graphics resource management module 110 solves these problems by intelligently selecting the hosts H-1, H-2 . . . H-M of the cluster to place virtual computing instances during initial placement so that virtual computing instances with vGPU requirements are efficiently placed on suitable hosts based not only on then CPU and memory requirements, but also based on their vGPU requirements. When virtual computing instances are placed based at least partly on their vGPU requirements, the power-on failures of virtual computing instances described above can be avoided. In addition, subsequent GPU underutilization conditions are resolved by the graphics resource management module, which will continually monitor GPU utilization in the cluster and make recommendations to more efficiently utilize the GPU resources of the cluster.

Figure 5:
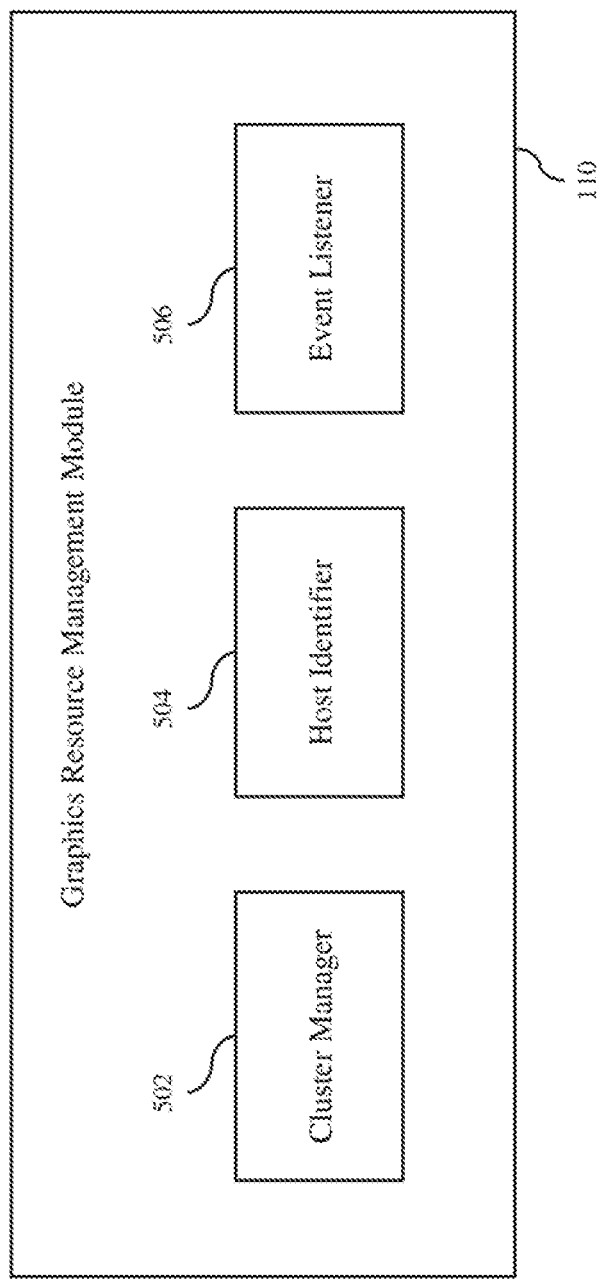
FIG. 5 is a block diagram of a graphics resource management module included in the distributed computer system in accordance with an embodiment of the invention.

Turning now to FIG. 5, components of the graphics resource management module 110 in accordance with an embodiment of the invention are shown. As illustrated in FIG. 5, the graphics resource management module includes a cluster manager 502, a host identifier 504 and an event listener 506. As described in more detail below, these components of the graphics resource management module operate to selectively make virtual computing instance placement decisions for graphics-oriented virtual computing instances, i.e., virtual computing instances with specific vGPU requirements. The components of the graphics resource management module may be implemented in any combination of hardware software and firmware. In some implementations, these components of the graphics resource management module are implemented as one or more software programs running in one or more physical computer systems using one or more processors associated with the physical computer system. In a particular implementation, these components of the graphics resource management module are implemented as one or more software programs running in the cluster management server 106, which may be a VMware vCenter™ Server.

The cluster manager 502 of the graphics resource management module 110 operates to identify all the hosts H-1, H-2 . . . H-M with GPUs in the cluster and fetches the details of the GPU hardware that is configured on the hosts, which occurs after the graphics resource management service is initialized on the cluster management server 106. In an embodiment, the cluster manager uses an application programming interface of the cluster manager server to retrieve the information from the cluster manager server, if such information is kept by the cluster manager server, or from the hosts. In an alternative embodiment, the cluster manager may retrieve the information directly from the hosts. The retrieved information may be stored in an internal or external database of the graphics resource management module. Thus, the retrieved information may be stored in any storage accessible by the graphics resource management module. The retrieved information may be stored in the database as a graphics resource allocation table. The following list is the information that is retrieved from the host computers and updated in the table: host identification (ID), physical GPU IDs of the NVIDIA GRID™ cards, graphics hardware versions (e.g., NVIDIA GRID™ K1 card or NVIDIA GRID™ K2 card), profile type and GPU count, which may include the count of virtual computing instances using a particular GPU, the remaining count of virtual computing instances that can use the particular GPU and the number of virtual computing instances that will be using the particular GPU and are currently being deployed. The cluster manager also monitors changes on the cluster for any addition or removal of hosts from the cluster and updates the graphics resource allocation table accordingly.

The host identifier 504 of the graphics resource management module 110 plays an important role in identifying a suitable host to place a graphics-oriented virtual computing instance, i.e., a virtual computing instance with specific vGPU requirements. Using the GPU resource allocation database, the host identifier selects the host ID matching the GPU requirements of the virtual computing instance, e.g., NVIDIA GRID™ vGPU™ profile, and provides the host ID and GPU ID during the initial deployment of the virtual computing instance or during a vGPU fragmentation resolution operation (described below). In an embodiment, the host identifier selects the suitable hosts fix all the graphics-oriented virtual computing instances in a pool of virtual computing instances being deployed (which may be every virtual computing instance in the pool) so that the graphics-oriented virtual computing instances can be placed in a desired optimal graphics resource utilization arrangement, e.g., minimal number of hosts. However, the suitable hosts for the other virtual computing instances in the pool are determined by the resource management module 108.

The event listener 506 of the graphics resource management module 110 operates to ensure that the GPU resource allocation database is always updated. The event listener monitors all the power operations that are being performed on the cluster manager server 106. Power operations relates to powering on graphics-oriented virtual computing instances in the cluster and powering off virtual computing instances in the cluster. In operation, each virtual computing instance's configuration is read by the event listener during power operations to determine whether the operation involves a graphics-oriented virtual computing instance or a non-graphics-oriented virtual computing instance, i.e., a virtual computing instance without any specified GPU requirements. The event listener ignores all the power operations that involve the non-graphics-oriented virtual computing instances. If the event listener identifies any power operations involving a graphics-oriented virtual computing instance, the event listener checks if the GPU resource allocation database has any entries related to that graphics-oriented virtual computing instance and updates the graphics resource allocation table with active flags indicating that graphic resources allocated to that virtual computing instance are consumed (during power-on operation) or available to use (during power-off operation).

Figure 6:
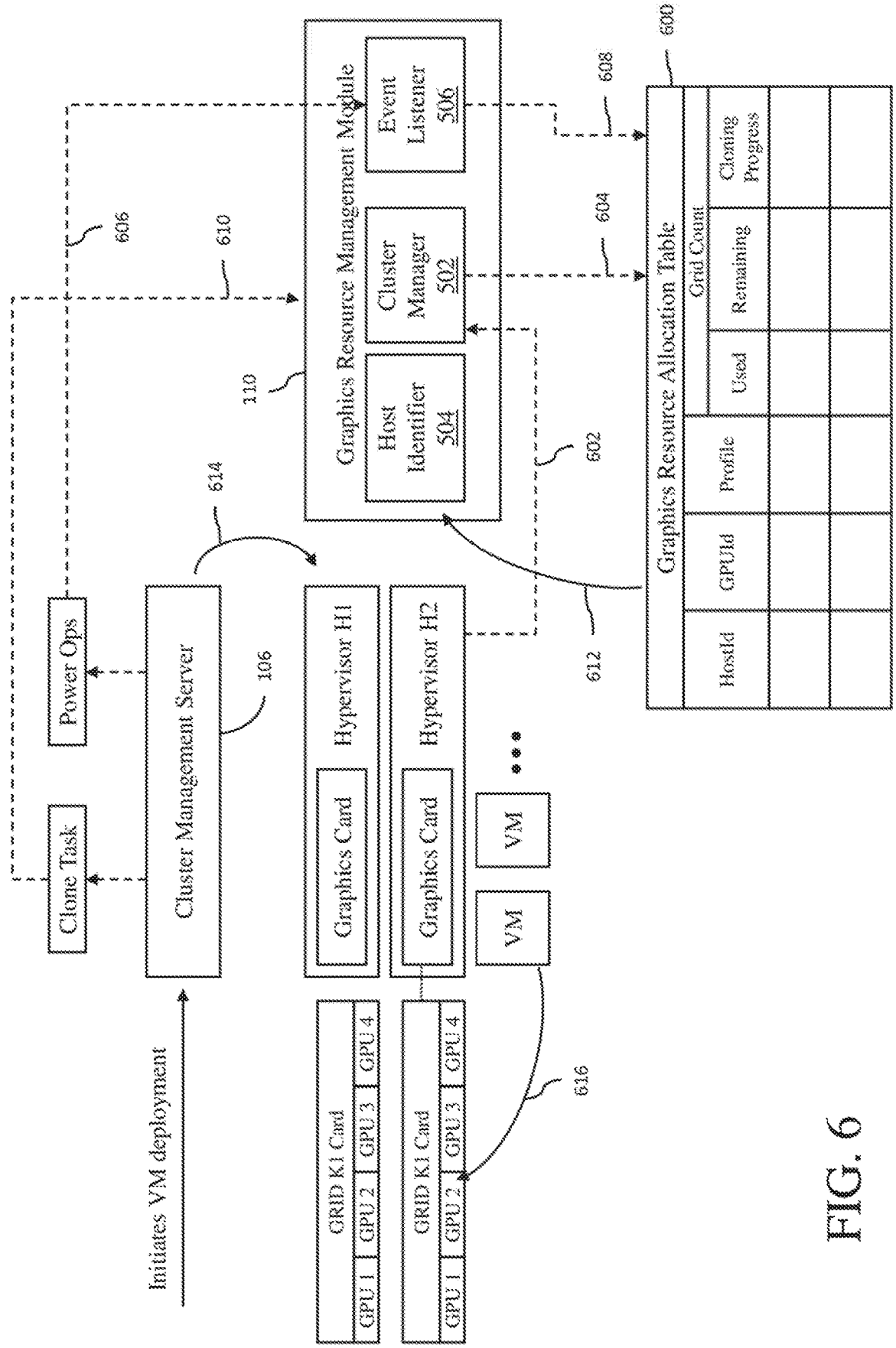
FIG. 6 is a block diagram illustrating how the graphics resource management module and its components operate in accordance with an embodiment of the invention.

FIG. 6 illustrates how the graphics resource management module 110 and its components, i.e. the cluster manager 502, the host identifier 504 and the event listener 506, operate in accordance with an embodiment of the invention. The cluster manager maintains a graphics resource allocation table 600 by updating the graphics resource allocation table when necessary. As indicated by line 602, the hosts, e.g., hosts H1 and H2, of the cluster provide host and/or GPU information to the cluster manager 502. The information may be provided in response to requests from the cluster manager, for example, when the graphics resource management module is first enabled. The information may also be provided when a host is added to the cluster being managed by the cluster management server 106. As indicated by line 604, the cluster manager updates the graphics resource allocation table 600 using the host and/or GPU information received from the hosts.

The event listener 506 listens to the cluster management server 106 for any power operations involving graphics-oriented VMs and updates the graphics resource allocation table 600 for the graphics-oriented VMs involved in the power operations. As indicated by line 606, the event listener gets power cycle updates for each power operation performed by the cluster management server, which may include power, operations involving graphics-oriented VMs. As indicated by line 608, the event listener then identifies any graphics-oriented VM involved in the power operations and updates the used and remaining counts in the graphics resource allocation table for the respective GPU ID. As an example, if a graphics-oriented VM assigned to a particular GPU ID is powered off, then the used count is decreased by one and the remaining count is increased by one for that particular GPU ID.

The host identifier 504 selects a host and a GPU of that host when a graphics-oriented VM is being deployed on the cluster in the distributed computer system 100. As indicated by line 610, the graphics resource management module 110 monitors the cluster management server 106 for any VM clone task, which is part of a VM deployment process. VM clone task involves creating a clone or a copy of a VM using an existing VM or a VM template, which is a master copy of a VM. During a pool deployment process, a clone application programming interface (API) of the cluster management server 106 is being internally called to execute a cloning process to create a VM. The graphics resource management module identifies parameters passed to the clone API to determine whether the VM clone task is for a graphics-oriented VM. If the VM clone task is for a non-graphics-oriented VM, the selection of a host for the VM is performed by the resource management module 108 of the cluster management server 106. However, if the VM clone task is for a graphics-oriented VM, the selection of a host for the VM is performed by the host identifier 504. As indicated by line 612, if the VM clone task is for a graphics-oriented VM, the host identifier selects a host and GPU for the VM using the available GPU and host information in the graphics resource allocation table. As indicated by line 614, after the host and GPU ID have been selected, the cluster management server deploys the graphics-oriented VM in the selected host. In addition, as indicated by line 616, the VM is assigned to the selected GPU ID.

Figure 7:
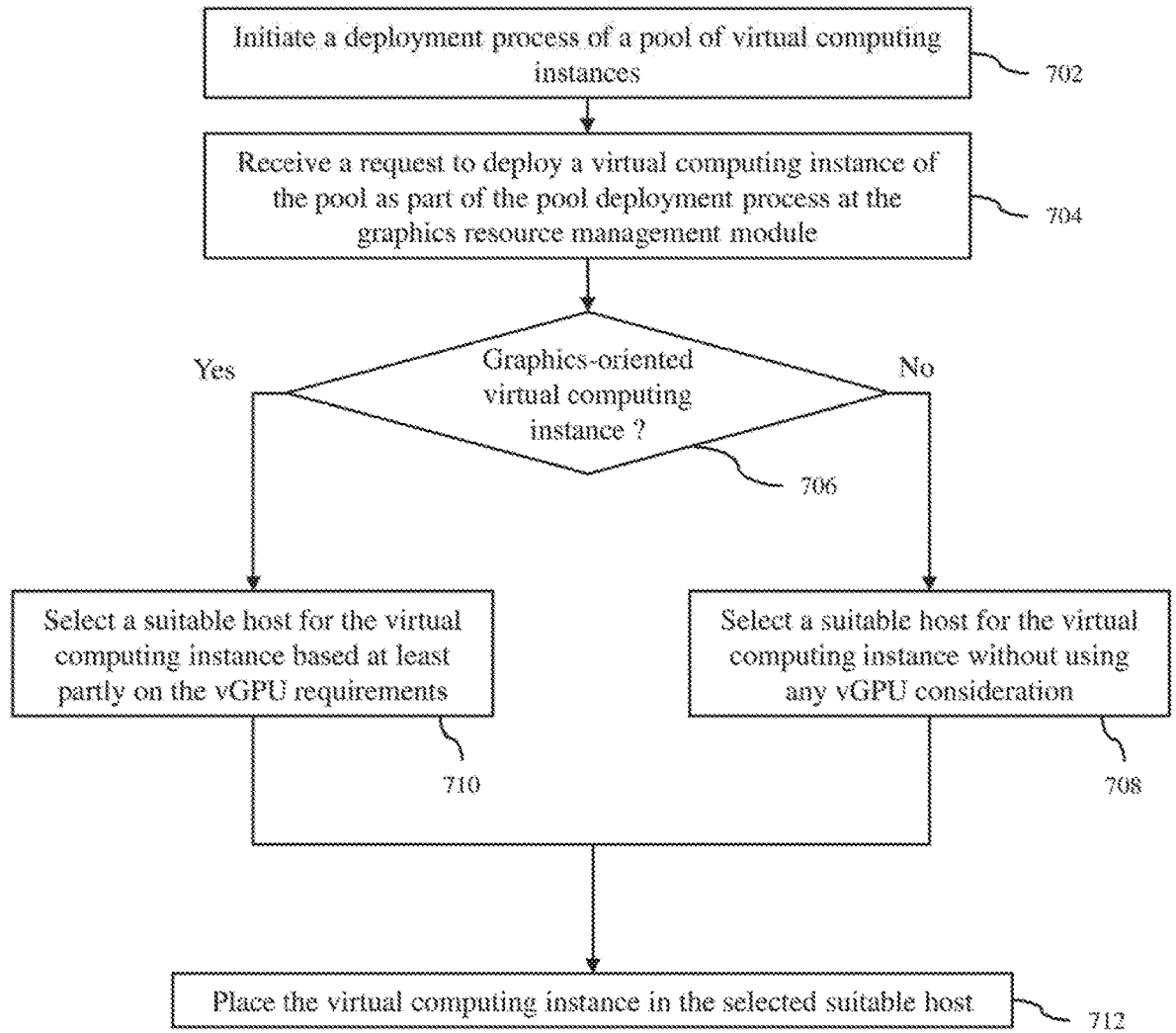
FIG. 7 is a process flow diagram of the initial placement operation of the distributed computer system in accordance with an embodiment of the invention.

The initial placement operation of the distributed computer system 100 in accordance with an embodiment of the invention is now described with reference to a process flow diagram of FIG. 7. At block 702, a user of the distributed computer system initiates a deployment process of a pool of virtual computing instances, such as VMs, using the cluster management server 106 via, for example, a user interface, which may be web-based application. At block 704, a request to deploy a virtual computing instance of the pool as part of the pool deployment process is received at the graphics resource management module 110. The request may include various parameters associated with the virtual computing instance being deployed, including parameters related to vGPU requirements and other resource requirements of the virtual computing instance.

At block 706, a determination is made by the graphics resource management module 110 whether the virtual computing instance is a graphics-oriented virtual computing instance. If the current virtual computing instance being deployed is not a graphics-oriented virtual computing instance, the operation proceeds to block 708, where a suitable host for the virtual computing instance is selected without using any vGPU consideration by the resource management module 108 of the cluster management server 106. In an implementation, the host selection may be performed using an algorithm used in the current VMware vSphere® Distributed Resource Scheduler™ module. Next, at block 712, the virtual computing instance is placed in the selected suitable host and GPU ID by the cluster management server.

However, of the current virtual computing instance being deployed is a graphics-oriented virtual computing instance, the operation proceeds to block 710, where a suitable host for the virtual computing instance is selected by the host identifier 504 of the graphics resource management module 110 based at least partly on the vGPU requirements of the virtual computing instance using the information in the GPU resource allocation database. In a particular implementation, the cluster ID in the request is replaced by the host ID of the selected suitable host by the host identifier. The operation then proceeds to block 712, where the virtual computing instance is placed on the selected suitable host and GPU ID by the cluster management server 106.

Once the virtual computing instances are placed on the suitable hosts, the virtual computing instances are powered on to begin their operations. As the virtual computing instances are power on, the event listener 506 of the graphics resource management module 110 monitors the power-on operations of the virtual computing instances and updates the GPU IDs in the GPU resource allocation database for the powered-on virtual computing instances.

Since the host identifier takes into consideration the vGPU requirements of virtual computing instances, the virtual computing instances can be placed on hosts in a cluster that ensures optimal utilization of GU resources in the cluster. In addition, the host identifier 504 does not have to distribute the virtual computing instances in a balanced manner to the different hosts in the cluster. Thus, in the above example of two pool deployments where Pool-1 consists of four (4) VMs of K140Q profile and Pool-2 consists of seven (7) VMs of K180Q profile, the host identifier will place the four (4) VMs of K140Q profile on a single GPU of one of the two hosts and place the seven (7) VMs of K180Q profile on the remaining seven (7) GPUs of the two hosts. Thus, all of the VMs can be properly powered on since the vGPU requirements of all the VMs are satisfied without any heterogeneous issue.

Once all the virtual computing instances of a pool deployment have been placed in the suitable hosts, these virtual computing instances are powered on. However, the virtual computing instances may be distributed among the hosts in the cluster in an unbalanced manner. Each host with a graphics card can host a large number of virtual computing instances. As an example, a host with an NVIDIA GRID™ card is capable of hosting a maximum of thirty two (32) VMs and a minimum of four (4) graphics profile tagged VMs. In general, a host with a graphics card is capable of hosting more than one hundred (100) virtual desktop VMs. Thus, after a pool deployment of virtual computing instances, some or all of the hosts may be hosting both graphics-oriented entities and non-graphics-oriented virtual computing instances. In some embodiments, the graphics-oriented virtual computing instances placed on the hosts may not be compatible for certain processes or operations, such as a live migration of running VMs from one physical server to another (e.g., VMware vSphere® vMotion® operation) for graphics-oriented virtual computing instances hosted on hosts with graphics cards (such as NVIDIA GRID™ cards). In an embodiment where the hosted graphics-oriented virtual computing instances are not compatible for automated migration, the graphics-oriented VMs are forcefully pinned to the hosts on which the VMs were initially placed by the graphics resource management module 110. In this embodiment, when the load on a host with both graphics-oriented VMs and non-graphics-oriented VMs increases, only the non-graphics-oriented VMs are considered for load balancing by the resource allocation module 108. Thus, only the non-graphics-oriented VMs in the cluster participate in any load balancing operations.

Figure 8A:
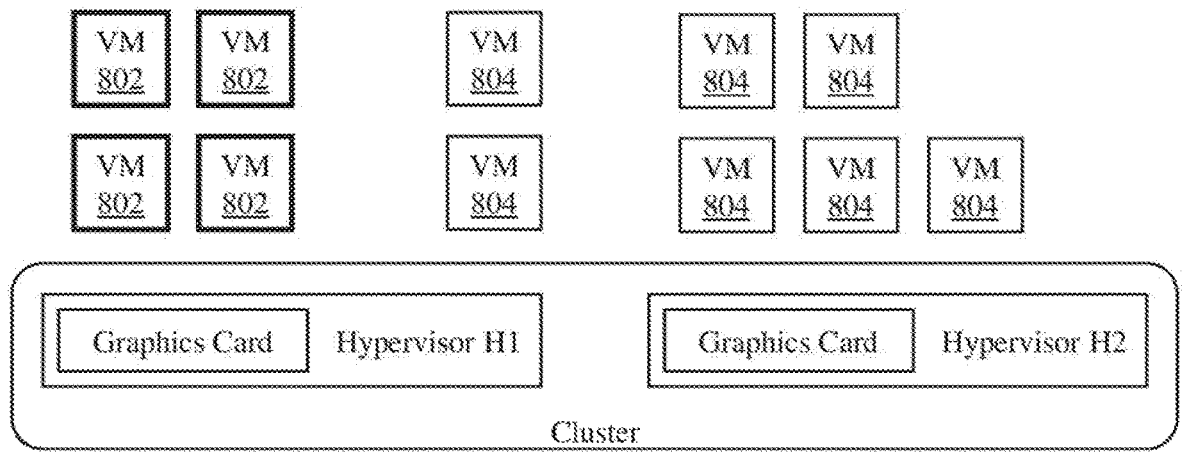
FIGS. 8A and 8B are diagrams illustrating a load balancing process when virtual computing instances are placed on hosts in a cluster in an unbalanced manner in accordance with an embodiment of the invention.
Figure 8B:
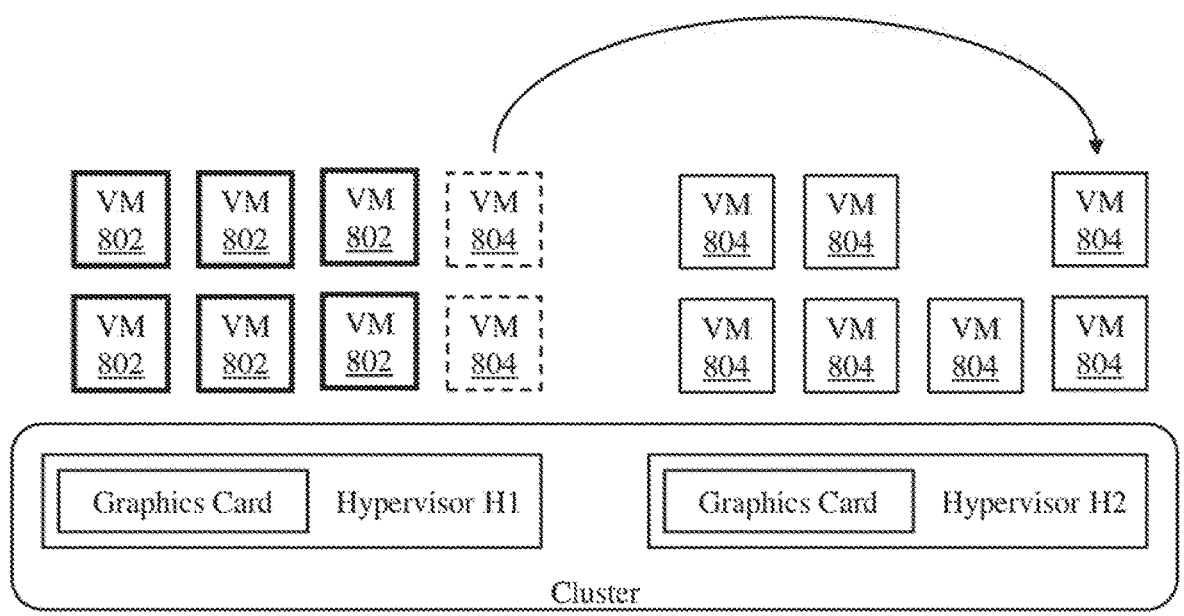

FIGS. 8A and 8B illustrate this load balancing process using an example of a cluster with two hosts, which are indicated as hypervisor and hypervisor H2. As shown in FIG. 8A, four (4) graphics-oriented VMs 802 have been placed on hypervisor H1 by the graphics resource management module 110. In addition, seven (7) non-graphics-oriented VMs 804 have been placed on hypervisors H1 and H2 by the resource management module 108. In particular, two (2) non-graphics-oriented VMs 804 have been placed on hypervisor H1 and five (5) non-graphics-oriented VMs 804 have been placed on hypervisor H2. It is assumed here that the current configuration of these VMs on Hypervisors H1 and H2 is load balanced. In FIG. 8B, two (2) additional graphics-oriented VMs 802 have been placed on hypervisor H1 by the graphics resource management module. As a result, the load on hypervisors H1 and H2 is not balanced. In response, the two (2) non-graphics-oriented VMs 804 on hypervisor H1 are moved to hypervisor H2 by the resource management module 108 of the cluster management server 106 using a live migration operation.

In the manner described above, pools of virtual computing instances, such as VMs, can be deployed that efficiently utilizes GPU resources of the cluster and the load on the hosts of the cluster is balanced. However, over time, the cluster may become underutilized with respect to GPU resources of the cluster. For example, some of the graphics-oriented virtual computing instances may be powered off by the end user of the virtual computing instances. Since the graphics-oriented virtual computing instances may be effectively pinned to their hosts, the utilization of the GPU resources of the hosts across the cluster may become less than optimal, which is referred to herein as a vGPU fragmentation issue. In an embodiment, the graphics resource management module 110 acts intelligently by identifying the GPU slots in the cluster that are now free or available due to recent power down operations of graphics-oriented virtual computing instances. As noted above, the GPU resource allocation database is continuously updated by the event listener 506. Thus, the graphics resource management module can perform cluster-level auditing of current GPU usage by all active virtual computing instances using the GPU resource allocation database and execute cluster-level consolidation of the active graphics-oriented virtual computing instances. That is, the graphics resource management module can analyze current GPU allocation of all the active graphics-oriented virtual computing instances using the current GPU resource allocation database, which would reveal all the available GPU slots that can support graphics-oriented virtual computing instances. The graphics resource management module then computes the optimal utilization of GPU resources for the current active graphics-oriented virtual computing instances, which may result in identification of one or more GPU slots that can be filled by one or more active graphics-oriented virtual computing instances. In an embodiment, the optimal utilization of GPU utilization means using minimal number of hosts to accommodate all the graphics-oriented virtual computing instances. Thus, the graphics resource management module may make a suggestion to one or more active graphics-oriented virtual computing instances that these virtual computing instances can be migrated to one or more different hosts to occupy current available GPU slots. In an embodiment, the migration suggestion is a suggestion to cold migrate one or more active graphics-oriented virtual computing instances during the next power cycle of a power management operation, which is performed by the cluster management server. In a particular implementation, the power management operation is performed by a power management module in the cluster management server 106 that can consolidate virtual computing instances on fewer hosts to conserve power, such as a VMware vSphere® Distributed Power Management™ module.

This fragmentation issue is further explained using an example of three (3) hosts with NVIDIA GRID™ cards, host 1, host 2 and host 3, in a cluster. Let's assume that after deployment of graphics-oriented VMs, 100% graphics hardware utilization was achieved on the host 1 and the host 2. However, only 20% graphics hardware utilization was achieved on the host 3. Over time, the end user has powered off the VMs hosted on the host 1 and the host 2. In this scenario, the graphics resource management module 110 would determine if the graphics-oriented VMs running on the host 3 can be accommodated on the free GPU slots of the host 1 and the host 2 due to the power-off operations of the VMs on the host 1 and the host 2. If the compatibility criteria allow the VMs on the host 3 to be accommodated either on the host 1 or the host 2, the graphics resource management module will pass a notification to the graphics-oriented VMs on the host 3, indicating that these VMs can be cold migrated during the next power cycle. The cold migration of these VMs on the host 3 will allow the cluster management server 106, e.g., VMware vSphere® Distributed Power Management™ module running on the cluster management server, to push the host 3 to a standby mode, which would result in cost savings with respect to computing and power resources.

The vGPU fragmentation issue can be solved in a dynamic mode or a static mode. In a dynamic mode, the migration suggestion provided by the graphics resource management module 110 will be dynamically or automatically performed without any user input, such as an input from an administrator of a service provider, by the cluster management server 106, e.g., VMware vSphere® Distributed Poster Management™ module, during, for example, the next power cycle. In a static mode, the migration suggestion provided by the graphics resource management module will be not be automatically performed without user input. Thus, in this mode, a user such as an administrator of a service provider will have a choice to manually apply the migration recommendations, which may be performed during the next power cycle of the cluster management server.

Figure 9:
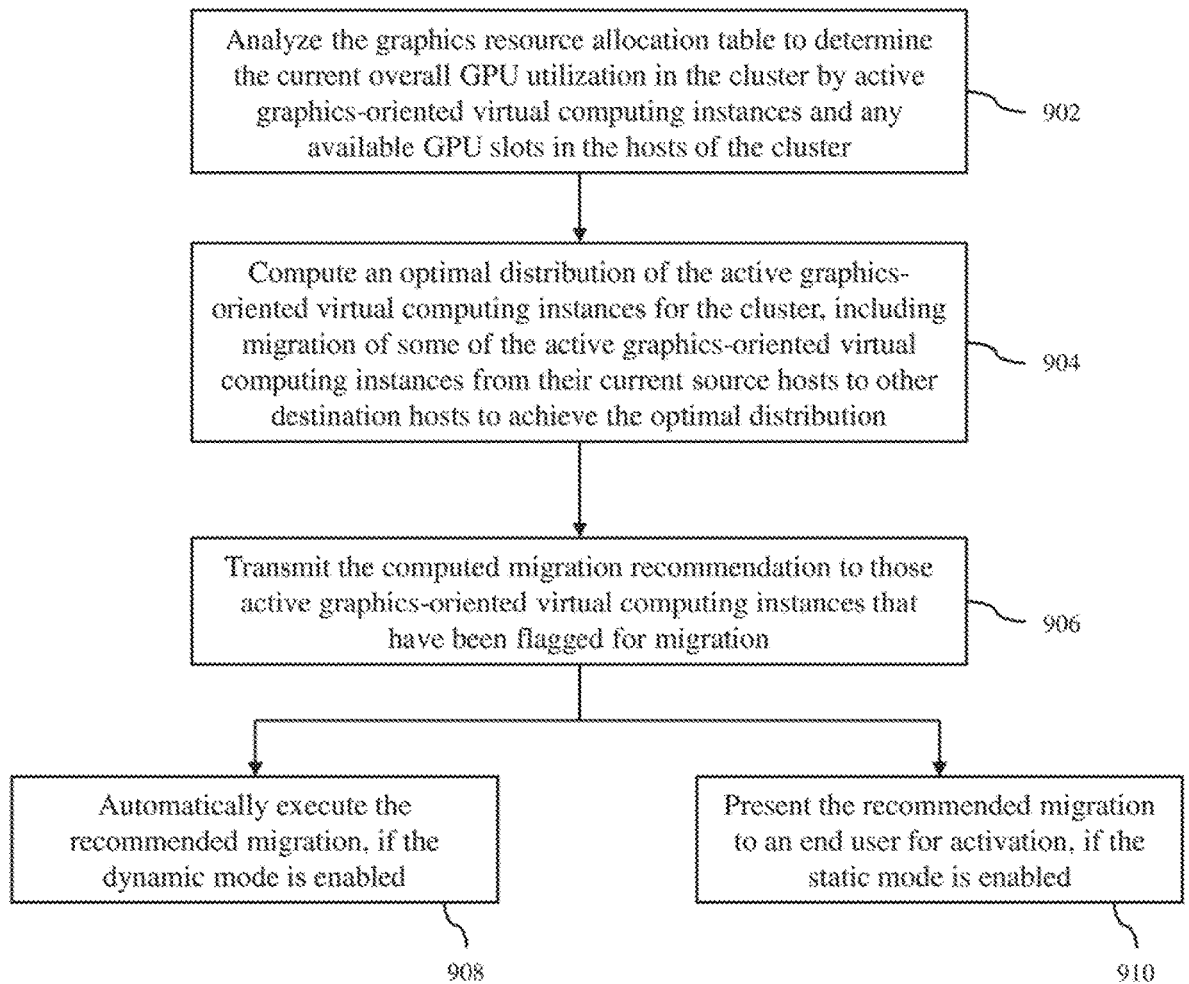
FIG. 9 is a process flow diagram of the vGPU fragmentation resolution operation of the distributed computer system in accordance with an embodiment of the invention.

The vGPU fragmentation resolution operation of the distributed computer system 100 in accordance with an embodiment of the invention is described with reference to a flow diagram of FIG. 9 In this description, it is assumed that some of the graphics-oriented virtual computing instances placed on die hosts H-1, H-2 . . . H-M of the distributed computer system have been turned off by an end user. Thus, the graphics resource allocation table has been updated accordingly by the event listener 506 of the graphics resource management module 110.

At block 902, the graphics resource allocation table is analyzed by the graphics resource management module 110 to determine the current overall GPU utilization in the cluster by active graphics-oriented virtual computing instances and any available (WV slots in the hosts of the cluster. The information regarding the current overall GPU utilization in the cluster by active graphics-oriented virtual computing instances may include the IDs of the active graphics-oriented virtual computing instances and the IDs of the GPU slots that are currently allocated to these virtual computing instances. At block 904, an optimal distribution of the active graphics-oriented virtual computing instances for the cluster is computed by the graphics resource management module, including migration of some of the active graphics-oriented virtual computing instances from their current source hosts to other destination hosts to achieve the optimal distribution. The migration of one or more active graphics-oriented virtual computing instances will be the recommended migration for this operation. These two processing blocks may be performed by the host identifier 504 of the graphics resource management module 110.

Next, at block 906, the computed migration recommendation is transmitted by the graphics resource management module 110 to those active graphics-oriented virtual computing instances that have been flagged for migration. Next, at block 908, the recommended migration is automatically executed by the cluster management server 106, if the dynamic, mode is enabled for the graphics resource management module. Alternatively, at block 910, the recommended migration is presented, by the graphics resource management module, to an end user for activation, if the static mode is enabled for the graphics resource management module.

Figure 10:
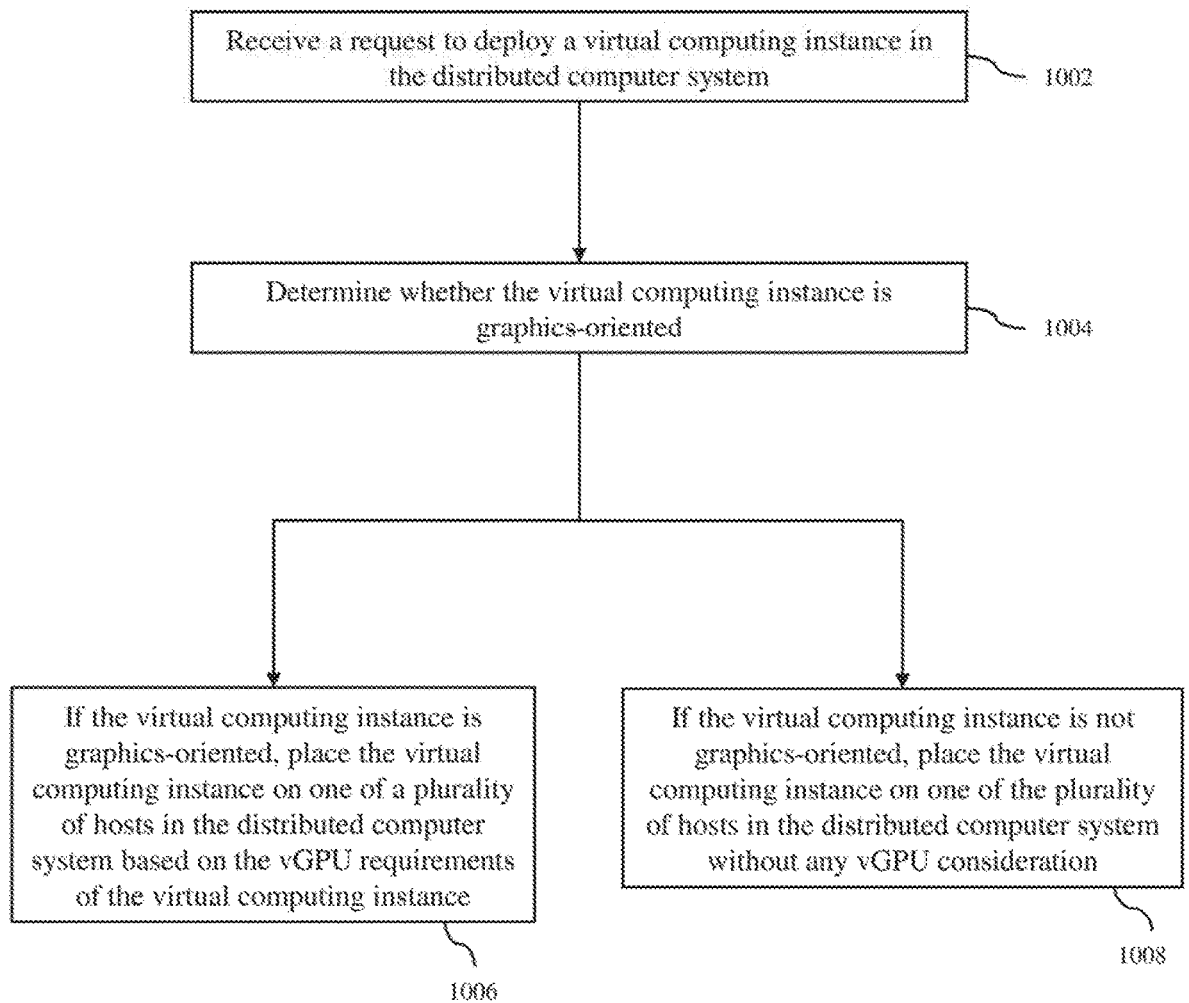
FIG. 10 is a flow diagram of a method for placing virtual computing instances in a distributed computer system in accordance with an embodiment of the invention.

A method for placing virtual computing instances, e.g., virtual machines, in a distributed computer system in accordance with an embodiment of the invention is described with reference to a flow diagram of FIG. 10. At block 1002, a request to deploy a virtual computing instance in the distributed computer system is received. In an embodiment, the deploy request is received at a cluster management server of the distributed computer system. At block 1004, a determination is made whether the virtual computing instance is graphics-oriented. A graphics-related virtual computing instance is a virtual computing instance with virtual graphic processing unit (vGPU) requirements. In an embodiment, this determination is performed by a cluster manager of a graphics resource management module in the distributed computer system. If the virtual computing instance is graphics-oriented, the virtual computing instance is placed on one of a plurality of hosts in the distributed computer system based on the vGPU requirements of the virtual computing instance, at block 1006. In an embodiment, the virtual computing instance is placed on a host, which has been selected by a host identifier of the graphics resource management module, by the cluster management server. However, if the virtual computing instance is not graphics-oriented, the virtual computing instance is placed on one of the plurality of hosts in the distributed computer system without any vGPU consideration, at block 1008. In an embodiment, the virtual computing instance is placed on a host, which has been selected by a resource management module based on memory and CPU requirements of the virtual computing instance, by the cluster management server.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium, can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD) and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for placing virtual computing instances in a distributed computer system, the method comprising:
    receiving a request to deploy a virtual computing instance in the distributed computer system;
    determining whether the virtual computing instance is one of graphics-oriented and not graphics-oriented, a graphics-oriented being a virtual computing instance with virtual graphic processing unit (vGPU) requirements;
    if the virtual computing instance is graphics-oriented, placing the virtual computing instance on one of a plurality of hosts in the distributed computer system based on the vGPU requirements of the virtual computing instance; and
    if the virtual computing instance is not graphics-oriented, placing the virtual computing instance on one of the plurality of hosts in the distributed computer system without any vGPU consideration,
    wherein placing the virtual computing instance on one of the plurality of hosts in the distributed computer system based on the vGPU requirements of the virtual computing instance includes selecting a suitable host for the virtual computing instance based on a graphics profile tagged to the virtual computing instance and graphics profile information of each graphics processing unit (GPU) of the hosts in the distributed computer system, wherein each of the different graphics profiles defines a different vGPU type and wherein each GPU of the hosts only allows virtual computing instances having the same graphics profile to run on that GPU concurrently.

2. The method of claim 1, wherein the graphics profile information of each graphics processing unit (GPU) of the hosts in the distributed computer system is included in graphics processing unit (GPU) resource allocation database, the GPU resource allocation database including GPU information for each host in the distributed computer system, any graphics profile allocated to each GPU of the hosts and availability information of each GPU of the hosts.

3. The method of claim 2, wherein the GPU information in the GPU resource allocation database includes identifications of hosts and identifications of GPUs, and wherein the availability information in the GPU resource allocation database includes a count of used GPU slots for each GPU and a count of remaining GPU slots for each GPU.

4. The method of claim 2, wherein selecting the suitable host for the virtual computing instance includes selecting a particular GPU of the suitable host using the GPU resource allocation database such that the graphics profile tagged to the virtual computing instance is the same as the graphics profile previously allocated to the particular GPU of the suitable host.

5. The method of claim 2, further comprising updating the availability information of the GPU resource allocation database when a power operation is performed on a particular graphics-oriented virtual computing instance running in the distributed computer system to indicate whether graphic resources allocated to the particular graphics-oriented virtual computing instance are consumed or available for use.

6. The method of claim 1, wherein placing the virtual computing instance on one of a plurality of hosts in the distributed computer system based on the vGPU requirements of the virtual computing instance includes selecting a suitable host by a graphics resource management module that takes into consideration the vGPU requirements of the virtual computing instance and wherein placing the virtual computing instance on one of the plurality of hosts in the distributed computer system without any vGPU consideration includes selecting a suitable host by a resource management module that takes into consideration memory and computing requirements of the virtual computing instance.

7. The method of claim 1, further comprising monitoring a cluster management server for a clone task, and wherein determining whether the virtual computing instance is graphics-oriented includes identifying parameters associated with the clone task to determine whether the virtual computing instance is graphics-oriented.

8. The method of claim 1, further comprising:
analyzing a current distribution of all the graphics-oriented virtual computing instances that are active in the distributed computer system after at least one graphics-oriented virtual computing instance in the distributed computer system has been turned off; and
recommending a migration of at least one of the graphics-oriented virtual computing instances from a source host to a destination host in the distributed computer system so that the source host can be placed in a standby mode to conserve power.

9. The method of claim 8, further comprising automatically executing the recommended migration without user input.

10. A computer-readable storage medium containing program instructions for placing virtual computing instances in a distributed computer system, wherein execution of the program instructions by one or more processors of a computer system causes the one or more processors to perform steps comprising:
receiving a request to deploy a virtual computing instance in the distributed computer system;
determining whether the virtual computing instance is one of graphics-oriented and not graphics-oriented, a graphics-oriented being a virtual computing instance with virtual graphic processing unit (vGPU) requirements;
if the virtual computing instance is graphics-oriented, placing the virtual computing instance on one of a plurality of hosts in the distributed computer system based on the vGPU requirements of the virtual computing instance; and
if the virtual computing instance is not graphics-oriented, placing the virtual computing instance on one of the plurality of hosts in the distributed computer system without any vGPU consideration
wherein placing the virtual computing instance on one of the plurality of hosts in the distributed computer system based on the vGPU requirements of the virtual computing instance includes selecting a suitable host for the virtual computing instance based on a graphics profile tagged to the virtual computing instance and graphics profile information of each graphics processing unit (GPU) of the hosts in the distributed computer system, wherein each of the different graphics profiles defines a different vGPU type and wherein each GPU of the hosts only allows virtual computing instances having the same graphics profile to run on that GPU concurrently.

11. The computer-readable storage medium of claim 10, wherein the graphics profile information of each graphics processing unit (GPU) of the hosts in the distributed computer system is included in graphics processing unit (GPU) resource allocation database, the GPU resource allocation database including GPU information for each host in the distributed computer system, any graphics profile allocated to each GPU of the hosts and availability information of each GPU of the hosts.

12. The computer-readable storage medium of claim 11, wherein selecting the suitable host for the virtual computing instance includes selecting a particular GPU of the suitable host using the GPU resource allocation database such that the graphics profile tagged to the virtual computing instance is the same as the graphics profile previously allocated to the particular GPU of the suitable host.

13. The computer-readable storage medium of claim 11, wherein the steps further comprise updating the availability information of the GPU resource allocation database when a power operation is performed on a particular graphics-oriented virtual computing instance running in the distributed computer system to indicate whether graphic resources allocated to the particular graphics-oriented virtual computing instance are consumed or available for use.

14. The computer-readable storage medium of claim 10, wherein the steps further comprise monitoring a cluster management server for a clone task, and wherein determining whether the virtual computing instance is graphics-oriented includes identifying parameters associated with the clone task to determine whether the virtual computing instance is graphics-oriented.

15. A system comprising:
memory; and
a processor configured to:
receive a request to deploy a virtual computing instance in a distributed computer system;
determine whether the virtual computing instance one of graphics-oriented and not graphics-oriented, a graphics-oriented being a virtual computing instance with virtual graphic processing unit (vGPU) requirements;
if the virtual computing instance is graphics-oriented, place the virtual computing instance on one of a plurality of hosts in the distributed computer system based on the vGPU requirements of the virtual computing instance; and
if the virtual computing instance is not graphics-oriented, place the virtual computing instance on one of the plurality of hosts in the distributed computer system without any vGPU consideration,
wherein the processor is further configured to select a suitable host for the virtual computing instance based on a graphics profile tagged to the virtual computing instance and graphics profile information of each graphics processing unit (GPU) of the hosts in the distributed computer system to place the virtual computing instance on one of the plurality of hosts in the distributed computer system based on the vGPU requirements of the virtual computing instance, wherein each of the different graphics profiles defines a different vGPU type and wherein each GPU of the hosts only allows virtual computing instances having the same graphics profile to run on that GPU concurrently.

16. The system of claim 15, wherein the graphics profile information of each graphics processing unit (GPU) of the hosts in the distributed computer system is included in graphics processing unit (GPU) resource allocation database, the GPU resource allocation database including GPU information for each host in the distributed computer system, any graphics profile allocated to each GPU of the hosts and availability information of each GPU of the hosts.

17. The system of claim 16, wherein the processor is further configured to select a particular GPU of the suitable host using the GPU resource allocation database such that the graphics profile tagged to the virtual computing instance is the same as the graphics profile previously allocated to the particular GPU of the suitable host.

* * * * *